United States Patent [19]

Patel et al.

[11] 4,031,056
[45] June 21, 1977

[54] PROCESS FOR THE REMOVAL OF VINYL CHLORIDE FROM LATEXES CONTAINING POLYVINYL CHLORIDE

[75] Inventors: Piyush J. Patel, Somerville; William Miringoff, Willingboro, both of N.J.

[73] Assignee: Tenneco Chemicals, Inc., Saddle Brook, N.J.

[22] Filed: Feb. 2, 1976

[21] Appl. No.: 654,251

Related U.S. Application Data

[63] Continuation-in-part of Ser. No. 553,869, Feb. 27, 1975, abandoned.

[52] U.S. Cl. .......................... 260/29.6 PT; 528/501

[51] Int. Cl.$^2$ ........................................ C08L 27/06
[58] Field of Search .............. 260/29.6 PT; 528/501

[56] References Cited

UNITED STATES PATENTS 3,371,059  2/1968  Rich ............................... 260/29.6

Primary Examiner—Stanford M. Levin
Attorney, Agent, or Firm—Evelyn Berlow

[57] ABSTRACT

Vinyl chloride is removed from latex that contain polyvinyl chloride by subjecting a fine spray of minute droplets of the latex to vacuum until the monomer content of the latex has been substantially reduced.

13 Claims, No Drawings

PROCESS FOR THE REMOVAL OF VINYL CHLORIDE FROM LATEXES CONTAINING POLYVINYL CHLORIDE

This is a continuation-in-part of our copending application Ser. No. 553,869, which was filed on Feb. 27, 1975 and which has been abandoned.

This invention relates to a process for the purification of polyvinyl chloride. More particularly, it relates to a rapid and economical process for the removal of vinyl chloride from polyvinyl chloride latexes.

When vinyl chloride is polymerized in an aqueous medium by suspension or emulsion polymerization techniques, there is obtained a latex that contains from 5% to 50% by weight of polyvinyl chloride and up to about 10% by weight of residual vinyl chloride. The latex is then heated under reduced pressure to about 65° C. to remove most of the unreacted monomer from it. As it is ordinarily practiced, this stripping procedure reduces the monomer content of the latex to about 1000 parts to 50,000 parts by weight of vinyl chloride per million parts by weight of latex. Further processing of such a latex yields dried products that may contain 500 ppm or more of monomer.

In view of the recently-developed safety standards that require that the amount of vinyl chloride in polyvinyl chloride and in the atmosphere that workers breathe be maintained at very low levels, it is necessary that the monomer content of the latex be sufficiently reduced so that these requirements can be met.

A number of procedures for the removal of residual monomer from polyvinyl chloride latex have been proposed, but none has proven to be entirely satisfactory. Procedures that involve heating the latex to temperatures above 65° C. or subjecting it to conditions of high shear are effective in reducing the vinyl chloride content to low levels, but they have an adverse effect on the stability and filterability of the latex and on the functional performance of the dried product. In addition, the foaming that often occurs at elevated temperatures creates serious processing problems. Other procedures, for example, sparging with an inert gas or low temperature stripping, either do not reduce the monomer content of the latex to the desired low level or are too slow to be practiced commercially.

In accordance with this invention, an improved process has been developed for the removal of residual monomer from polyvinyl chloride latexes. This process rapidly reduces the vinyl chloride content of the latex without affecting its stability and other properties or the properties of the dried product. Unlike many of the previously-known monomer removal procedures, the process of this invention does not destabilize the latex, thereby changing the particle size distribution of the polyvinyl chloride, and so does not have a detrimental effect on the filterability of the latex or on the handling and drying characteristics of the wet polymer cake.

In the process of this invention, a latex that contains from 5% to 50% by weight of polyvinyl chloride and from 1000 ppm to 50,000 ppm of vinyl chloride is atomized under conditions of low shear, and the resulting fine spray of minute droplets of the latex is subjected to vacuum until the monomer content of the latex has been substantially reduced. Following this treatment, the latex is further processed to yield a solid product that contains less than 50 ppm and in most cases less than 10 ppm of vinyl chloride. The monomer and other gases that leave the droplets of latex during the de-aeration are removed through the vacuum system. They may, if desired, be recovered and recycled.

During the removal of vinyl chloride by the process of this invention, a fine spray of minute droplets of a polyvinyl chloride latex that contains more than 1000 ppm of vinyl chloride is maintained at a temperature between 20° C. and 70° C. while it is de-aerated at a pressure below about 400 torr and preferably below 200 torr until its monomer content has been substantially reduced. Best results have been obtained when a fine spray of minute droplets of a latex that contains 15% to 30% by weight of polyvinyl chloride and that is at a temperature between 40° C. and 60° C. is de-aerated at a pressure below 100 torr.

The process may be carried out in any suitable apparatus in which the latex can be atomized without subjecting it to conditions of high shear and the resulting droplets can be de-aerated rapidly under vacuum at a relatively low temperature. For example, the process has been carried out successfully in a Fryma Vacuum De-Aeration Unit, which is marketed by Fryma Maschinen AG. This apparatus comprises a closed chamber that can be evacuated, a vacuum system to which the closed chamber is connected, and at the top of the chamber a distributor system that comprises a perforated disc which can be rotated rapidly and through which latex can be introduced into the closed chamber. The perforations in the disc may range from about 0.1 mm. to 3 mm. in diameter; they are preferably between 0.5 mm. and 1.5 mm. in diameter.

In the practice of the process of this invention, a polyvinyl chloride latex, which is at the desired temperature, is fed into the distributor system of the de-aeration unit. As it passes through the rapidly-rotating disc, the stream of latex is atomized under conditions of low shear. The resulting fine spray of minute droplets of latex is de-aerated as it falls through the evacuated chamber, thereby separating gaseous vinyl chloride from the latex. Latex treated in this way may be removed from the apparatus and further processed, or it may be recycled through the apparatus until its monomer content reaches the desired low level. The latex is preferably passed through a colloid mill before it is fed into the distributor system of the de-aeration unit.

The amount of monomer that is removed from the latex by this vacuum de-aeration procedure is dependent upon such factors as the composition of the latex, the temperature of the latex and the rate at which it is fed into the de-aeration unit, the capacity of the perforated disc, and the vacuum in the de-aeration chamber. The combination of these variables that will give the optimum results for each latex and for each vacuum de-aeration unit can be readily determined by carrying out a few preliminary experiments.

As used herein, the term "polyvinyl chloride" includes both the high molecular weight homopolymers of vinyl chloride and the high molecular weight copolymers formed by the copolymerization of vinyl chloride with an essentially water-insoluble ethylenically-unsaturated monomer that is copolymerizable therewith. Suitable comonomers include vinyl acetate, vinyl propionate, vinyl stearate, vinyl benzoate, styrene, ethylene, propylene, isobutylene, methyl methacrylate, ethyl acrylate, acrylic acid, acrylamide, acrylonitrile, methacrylonitrile, vinylidene chloride, dialkyl fumarates and maleates, vinyl ethers, triallyl cyanurate, and the like. When one or more of these comonomers is used, the monomer component contains at least 70% and preferably 80% to 90% of vinyl chloride.

The polyvinyl chloride latex that is treated in accordance with the process of this invention to remove residual vinyl chloride from it may be prepared by the well-known suspension or emulsion polymerization processes. In the suspension polymerization processes, the monomer is suspended in water by a suspending agent and agitation. The polymerization is initiated with a suitable free radical-generating polymerization initiator, such as lauroyl peroxide, benzoyl peroxide, diisopropyl peroxydicarbonate, di-2-ethylhexyl peroxydicarbonate, tertiary butyl peroxypivalate, azobisisobutyronitrile, azobis-2,4-dimethylvaleronitrile, and mixtures thereof. Suspending agents that may be used include methylcellulose, hydroxymethylcellulose, hydroxyethylcellulose, hydrolyzed polyvinyl acetate, gelatin, methyl vinyl ether-maleic anhydride copolymers, and the like. In emulsion polymerization processes, the polymerization initiator may be hydrogen peroxide, an organic peroxide, a persulfate, or a redox system. Surface-active agents, such as alkyl sulfates, alkane sulfonates, alkyl aryl sulfonates, and fatty acid soaps, are used as emulsifiers in these processes. The latex that is produced by these processes is heated under vacuum to about 65° C. to remove most of the unreacted monomer from it. The resulting stripped latex generally contains 5% to 50% and preferably 15% to 30% by weight of polyvinyl chloride as particles that range in size from 0.01 micron to 2 microns and from about 1000 ppm to 50,000 ppm of vinyl chloride. Following the removal of vinyl chloride from it by the process of this invention, the latex may be dewatered, for example, on a rotary drum filter and then dried, or it may be spray dried. Polyvinyl chloride prepared in this way contains less than 50 ppm and in most cases less than 10 ppm of vinyl chloride. It can be further processed without creating a health hazard.

The invention is further illustrated by the following examples.

EXAMPLE 1

A. An aqueous dispersion containing vinyl chloride, a mixture of lauroyl peroxide and di-2-ethylhexyl peroxydicarbonate as initiator, and methylcellulose as suspending agent was homogenized and then polymerized to form a latex containing polyvinyl chloride particles ranging in size from 0.01 micron to 2 microns. The polyvinyl chloride content of the latex was about 30%. The latex was heated under vacuum at a temperature below 65° C. to reduce its vinyl chloride content to less than about 15,000 parts by weight per million parts by weight of latex.

B. Portions of a latex which was prepared by the procedure described in Example 1A and which contained 8800 ppm. of vinyl chloride were heated and then fed through a rotating perforated disc having holes 1.5 mm. in diameter into the evacuated chamber of a Fryma Vacuum De-Aeration Unit (Model VE V). During the de-aeration, the chamber was maintained at a pressure of 80 torr. The treated latex was analyzed for monomer. Some of the portions of treated latex were recycled through the deaeration unit. The temperatures to which the portions of latex were heated, the rates at which they were fed into the de-aeration chamber, and the results obtained are given in Table I.

The vinyl chloride that separated from the latex was removed from the chamber through the vacuum system and recovered.

The treated latex was removed from the chamber and filtered. No foaming occurred during the filtration step. The de-aeration did not adversely affect the filterability of the latex. After drying, the product contained less than 10 ppm of vinyl chloride.

EXAMPLE 2

The procedure described in Example 1B was repeated using a latex that contained 13,930 ppm of vinyl chloride. The temperature to which portions of the latex were heated, the rates at which they were fed into the de-aeration chamber, and the results obtained are given in Table I.

Table I

De-Aeration of PVC Latexes at 80 Torr Using a Rotating Perforated Disc Having 1.5 mm Holes

| Example | Temp. (° C.) | Rate Kg/Hr. | Vinyl Chloride Content of Latex (parts by weight of VC per million parts by weight of latex) | | | | |
|---|---|---|---|---|---|---|---|
| | | | 1st Pass | 2nd Pass | 3rd Pass | 4th Pass | 5th Pass |
| 1* | 50 | 200 | 4940 | 1930 | 1720 | | |
| | 50 | 400 | 4940 | 4600 | 3860 | | |
| | 60 | 200 | 2150 | 1790 | 1500 | | |
| | 60 | 600 | 3400 | | | | |
| 2** | 50 | 200 | 11020 | 6030 | 4320 | 3330 | 2910 |
| | 50 | 600 | 9000 | | | | |
| | 60 | 200 | 3140 | 2300 | 1620 | | |
| | 60 | 600 | 3970 | | | | |
| | 60 | 100 | 2930 | 1880 | 1260 | 1050 | |

*Untreated latex contained 8,800 ppm of vinyl chloride
**Untreated latex contained 13,930 ppm of vinyl chloride The treated latex was removed from the chamber and filtered. The product after drying contained less than 10 ppm of vinyl chloride.

EXAMPLE 3

Portions of latexes which were prepared by the procedure described in Example 1A were heated to 60° C., passed through a colloid mill, and then fed at the rate of 850 Kg/hr. through a rotating perforated disc which had 0.5 mm holes into the evacuated chamber of a Fryma Vacuum De-Aeration Unit. During the de-aeration, the chamber was maintained at a pressure of 80 torr. The portions of treated latex were analyzed for monomer and then recycled through the colloid mill and the de-aerator. The results obtained are given in Table II.

EXAMPLE 4

A latex prepared by the procedure described in Example 1A was heated at 60° C., passed through a colloid mill, and then fed at the rate of 850 Kg/hr. through a rotating perforated disc having 0.5 mm. holes into the evacuated chamber of a Fryma Vacuum De-Aeration Unit. During the de-aeration, the chamber was maintained at a pressure of 80 torr. The latex was continuously recirculated through the colloid mill and de-aeration unit for 2 hours, which was equivalent to about 10.4 passes through the unit. During the treatment, samples of the latex were taken periodically and analyzed for monomer. The results obtained are given in Table III.

Table II

De-Aeration of PVC Latexes at 80 Torr and 60° C. Using a Colloid Mill and a Rotating Perforated Disc Having 0.5 mm Holes

| Ex. No. | Vinyl Chloride Content of Untreated Latex (ppm) | Vinyl Chloride Content of Latex After Indicated Number of Passes Through Colloid Mill and De-Aeration Unit (ppm) | | | | |
|---|---|---|---|---|---|---|
| | | 1 | 2 | 3 | 4 | 5 |
| 3a | 8453 | 1777 | 1358 | 800 | 557 | 404 |
| 3b | 8377 | 1671 | 1180 | 941 | 664 | 423 |

Table III

Continuous De-Aeration of PVC Latex at 60° C. and at a Pressure of 80 Torr Using a Colloid Mill and a Rotating Perforated Disc Having 0.5 mm Holes

| Time (Hours) | Vinyl Chloride Content of Latex (ppm) |
|---|---|
| 0 | 8400 |
| 0.5 | 1370 |
| 1.0 | 800 |
| 1.5 | 615 |
| 2.0 | 480 |

EXAMPLE 5

A latex prepared by the procedure of Example 1A was heated to 47.5° C. and then fed at the average flow rate of 410 Kg/hr. through a rotating perforated disc having 1.0 mm. holes into the evacuated chamber of a Fryma Vacuum De-Aeration Unit (Model LVC). During the de-aeration, the chamber was maintained at a pressure of 285 torr. Samples were taken periodically and analyzed for monomer. The results obtained are given in Table IV.

The vinyl chloride that separated from the latex was removed from the chamber through the vacuum system and recovered.

The treated latex was removed from the chamber, filtered, and dried. No foaming occurred during the filtration step; the de-aeration did not adversely affect the filterability of the latex. The dried product contained less than 10 ppm of vinyl chloride.

Table IV

De-Aeration of PVC Latex at 47.5° C. and a Pressure of 285 Torr (Flow Rate - 410 Kg/hr.)

| Time (Minutes) | Vinyl Chloride Content of Latex (parts by weight of VC per million parts by weight of latex) |
|---|---|
| 0 | 9,300 |
| 2 | 510 |
| 3 | 445 |
| 5 | 390 |

EXAMPLE 6

A latex prepared by the procedure described in Example 1A was heated to 26.5° C. and then fed at the average flow rate of 410 kg/hr. through a rotating perforated disc having 1.0 mm holes into the evacuated chamber of a Fryma Vacuum De-Aeration Unit, which was maintained at a pressure of 20 torr. Samples were taken periodically and analyzed for monomer. The results are given in Table V.

Table V

De-Aeration of PVC Latex at 26.5° C. and a Pressure of 20 torr (Flow Rate - 410 Kg/hr.)

| Time (Minutes) | Vinyl Chloride Content of Latex (parts by weight of VC per million parts by weight of lates) |
|---|---|
| 0 | 15,811 |
| 3 | 9,612 |
| 4 | 9,352 |
| 5 | 8,615 |

The vinyl chloride that separated from the latex was removed from the chamber through the vacuum system and recovered.

The treated latex was removed from the chamber, filtered, and dried. The vacuum de-aeration did not create filtration or foaming difficulties. The dried product contained less than 50 ppm of vinyl chloride.

EXAMPLE 7

A latex prepared by the procedure described in Example 1A was heated to 43.5°–47.5° C. and then fed at the average flow rate of 120 kg/hr. through the rotating perforated disc which had 1.5 mm holes into the evacuated chamber of a Fryma Vacuum De-Aeration Unit which was maintained at a pressure of 350 torr. The treated latex was recirculated continuously through the unit with a peristaltic pump. Samples were taken periodically and analyzed for monomer. The results obtained are given in Table VI.

The vinyl chloride that separated from the latex was removed from the chamber through the vacuum system and recovered.

The treated latex was filtered and dried. No foaming occurred during the filtration step. The de-aeration did not adversely affect the filterability of the latex. The dried product contained less than 10 ppm of vinyl chloride.

Table VI

Continuous De-Aeration of PVC Latex at 43.5° – 47.5° C. and at a Pressure of 350 Torr (Flow Rate - 120 Kg/hr.)

| Time (Minutes) | Temperature of Latex (° C.) | Vinyl Chloride Content of Latex (ppm) |
|---|---|---|
| 0 | 45.5 | 10,826 |
| 10 | 43.5 | 6,278 |
| 20 | 45.5 | 3,740 |
| 60 | 46.0 | 621 |
| 83 | 47.5 | 318 |
| 120 | 47.5 | 120 |

COMPARATIVE EXAMPLE

Latexes prepared by the procedure described in Example 1A were subjected to low shear monomer removal techniques. The processes used and the monomer contents of the treated latexes are given in Table VII.

Table VII

Comparative Tests Using Low Shear Methods of Removing Vinyl Chloride from PVC Latex

| Process | Vinyl Chloride Content of Latex (ppm) After Indicated Time (Hours) | | | | | | | |
|---|---|---|---|---|---|---|---|---|
| | 0 | 1 | 2 | 4 | 6 | 8 | 10 | 12 |
| Sparging with | | | | | | | | |

Table VII-continued

Comparative Tests Using Low Shear Methods of Removing Vinyl Chloride from PVC Latex Vinyl Chloride Content of Latex (ppm) After Indicated Time (Hours)

| Process | | | | | | | | |
|---|---|---|---|---|---|---|---|---|
| Nitrogen | | | | | | | | |
| 90 cu. ft./hour | 10,826 | 8000 | 5,200 | 2100 | 900 | 400 | 190 | — |
| 5.7 cu. ft./hour | 10,826 | 9000 | 7,000 | 4900 | 3400 | 2500 | 2000 | 1600 |
| 1 cu. ft./hour | 10,826 | — | 10,000 | 7700 | 6000 | 5200 | 4400 | 4000 |
| Vacuum Treatment at 45° C. | | | | | | | | |
| Agitator Speed - | | | | | | | | |
| 65 rpm | 7,000 | — | 5,800 | — | 5000 | 4800 | 4300 | 4200 |
| 120 rpm | 7,000 | — | 3,400 | — | 2800 | 2100 | 2000 | 1800 |
| 220 rpm | 7,000 | — | 1,400 | — | 680 | 540 | 490 | 450 |
| Sparging with 8.5 cu.ft./hour of Nitrogen and Vacuum Treatment at 45° C. (agitator speed - 80 rpm) | 10,000 | — | 8,300 | 3700 | 1800 | 700 | 500 | 400 |
| Process of Ex. 7 | 10,826 | 621 | 120 | | | | | |

From the data in Table VII, it will be seen that the vacuum de-aeration process of Example 7 removed vinyl chloride from the latex far more rapidly than did sparging with nitrogen at rates up to 90 cubic feet per hour, low temperature stripping, or a combination of nitrogen sparging and low temperature stripping.

What is claimed is:

1. The process for the removal of vinyl chloride from an aqueous latex that contains from about 1000 parts to 50,000 parts by weight of vinyl chloride per million parts by weight of latex and from 5% to 50% by weight of a polymer selected from the group consisting of polyvinyl chloride and copolymers of vinyl chloride with at least one monomer copolymerizable therewith, said polymer being present in the latex as particles ranging in size from 0.01 micron to 2 microns, that comprises the steps of
   a. maintaining the latex at a temperature in the range of 20° C. to 70° C.,
   b. passing a stream of the latex through a rapidly-rotating perforated disc to form a fine spray of minute droplets of the latex,
   c. passing said spray into an evacuated chamber that is maintained at a pressure below about 400 torr, and
   d. recovering from said evacuated chamber an aqueous latex of reduced vinyl chloride content.

2. The process of claim 1 wherein in Step (a) the latex is maintained at a temperature in the range of 40° C. to 60° C.

3. The process of claim 1 wherein in Step (c) the evacuated chamber is maintained at a pressure below 200 torr.

4. The process of claim 1 wherein in Step (c) the evacuated chamber is maintained at a pressure below 100 torr.

5. The process of claim 1 wherein the perforated disc through which the latex is passed has holes ranging in size from 0.1 mm. to 3 mm.

6. The process of claim 1 wherein the perforated disc through which the latex is passed has holes ranging in size from 0.5 mm. to 1.5 mm.

7. The process of claim 1 wherein the stream of latex is passed through a colloid mill before it is passed through the rapidly-rotating perforated disc to form a fine spray of minute droplets of the latex.

8. The process of claim 1 wherein the aqueous latex recovered in Step (d) is recycled to Step (a) and Steps (b), (c), and (d) are repeated until the vinyl chloride content of the aqueous latex has reached the desired low level.

9. The process of claim 1 that comprises the steps of
   a. maintaining the latex at a temperature in the range of 40° C. to 60° C.,
   b. passing a stream of the latex through a colloid mill,
   c. passing the stream of latex through a rapidly-rotating perforated disc having holes ranging in size from 0.5 mm. to 1.5 mm. to form a fine spray of minute droplets of the latex.
   d. passing said spray into an evacuated chamber that is maintained at a pressure below 200 torr, and
   e. recovering from said evacuated chamber an aqueous latex of reduced vinyl chloride content.

10. The process of claim 9 wherein the evacuated chamber is maintained at a pressure below 100 torr.

11. The process of claim 9 wherein the perforated disc through which the latex is passed has holes about 0.5 mm. in diameter.

12. The process of claim 9 wherein the aqueous latex that is recovered in Step (e) is recycled to Step (a) and Steps (b), (c), (d), and (e) are repeated until the vinyl chloride content of the aqueous latex has reached the desired level.

13. The process of claim 1 wherein the aqueous latex contains 15% to 30% by weight of polyvinyl chloride.

* * * * *